United States Patent

[11] 3,586,766

[72] Inventors Charles H. Heuer
Glencoe;
Dwight J. Poppy, Arlington Heights, both of, Ill.

[21] Appl. No. 838,466
[22] Filed July 2, 1969
[45] Patented June 22, 1971
[73] Assignee Zenith Radio Corporation
Chicago, Ill.

[54] MATRIX AMPLIFIER
13 Claims, 1 Drawing Fig.

[52] U.S. Cl. .......... 178/5.4
MA, 178/5.4 TE, 330/31, 330/154
[51] Int. Cl. .......... H04m 9/18
[50] Field of Search .......... 178/5.4
MA, 5.4 TE

[56] References Cited

UNITED STATES PATENTS 3,461,225 8/1969 Crookshanks et al. ....... 178/5.4 TEST

OTHER REFERENCES

Blaser, L. and Bray D. " Color TV Procesing Using Integrated Circuits" IEEE TRANS. BROADCAST AND TELEVISION RECEIVERS Vol. BTR-12 pp 54— 60 Nov. 1966

Towers T. D. TRANSISTOR TELEVISION RECEIVERS pp 59— 61

*Primary Examiner*—Robert L. Richardson
*Assistant Examiner*—Donald E. Stout
*Attorneys*—John J. Pederson and Eugene M. Cummings ABSTRACT: A three transistor matrix amplifier is described for combining three color-difference signals from a chrominance demodulator with a luminance signal to form suitable color-control drive signals for a three-gun image reproducer. Each of the three-matrix amplifier transistors has a novel collector circuit which permits its output to be varied without affecting the setup of the image reproducer, and which simultaneously establishes a feedback circuit for stabilizing the operation of the transistor. Individual bypass capacitors associated with a common inductor serve to accentuate amplifier response to high frequency luminance signals while reducing response to spurious higher frequency signals.

PATENTED JUN 22 1971 3,586,766
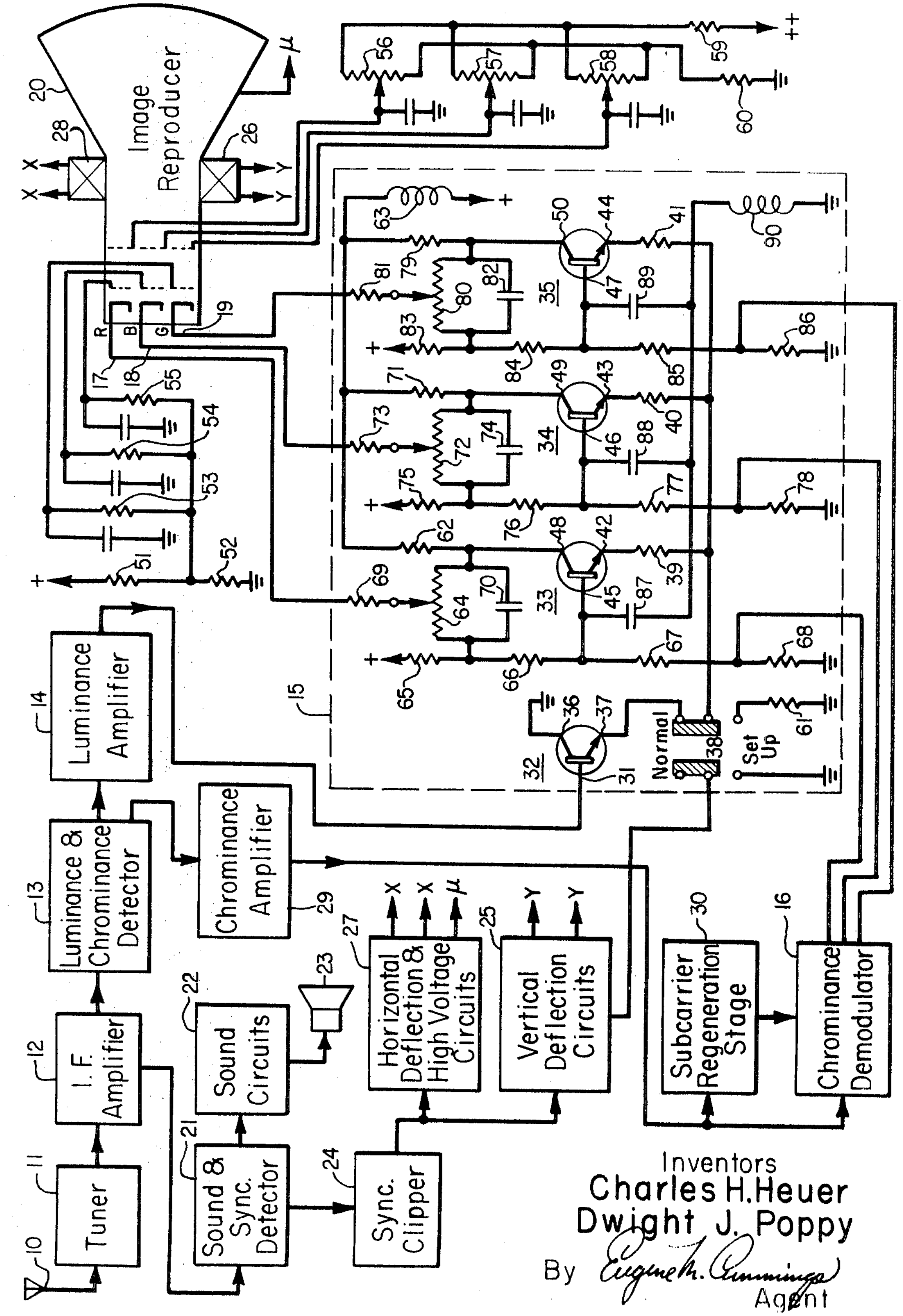
Inventors
Charles H. Heuer
Dwight J. Poppy
By Eugene M. Cummings
Agent

MATRIX AMPLIFIER

BACKGROUND OF THE INVENTION

The present invention relates to improvements in color television receiving systems and more particularly, to an improved luminance-chrominance matrix amplifier for use therein.

In accordance with present United States standards governing color television transmissions, luminance information, representing elemental brightness variations in a televised image, is transmitted on an amplitude-modulated main carrier component and chrominance information, representing color hue and saturation variations, is transmitted on a phase- and amplitude-modulated 3.58 MHz. subcarrier component. Demodulation of the luminance component is generally accomplished by means of a conventional AM video detector, and results in a composite video-frequency luminance signal having a bandwidth of approximately 4 MHz. Demodulation of the chrominance component requires in addition a synchronous detector, and results in three color-difference signals, commonly designated R-Y, G-Y and B-Y, which represent the difference between the respective primary colors and the transmitted luminance signal.

To control the trigun tricolor shadow-mask-type cathode-ray tube image reproducer in almost universal use today, it is necessary to combine, or matrix, the three color-difference signals with the luminance signal to form color-control signals of the form R, G and B. While this may be done internally within the image reproducer by applying the signals at a sufficient amplitude directly to respective control elements of the tube, it is more efficient to instead matrix the color-difference signals with the luminance or Y-signal at a lower level externally to the tube and then amplify the resulting R, G and B signals to a level suitable for application to the image reproducer.

An amplifier stage appropriate for this purpose, which may comprise a trio of individual amplifiers, one for each primary color, must necessarily meet certain functional requirements. For one, such a luminance-chrominance matrix amplifier stage must provide direct-current coupling between the luminance and color-difference signal sources and the image reproducer to insure faithful reproduction. It must establish a reference voltage to which the image reproducer can be set up or adjusted for cutoff, and must allow for individual adjustment of the amplitudes of the color-control signals applied to each gun to compensate for varying gun efficiencies without affecting either the reference voltage or the direct-current coupling. Furthermore, the stage must include suitable peaking circuitry for equalizing the higher-frequency video-components with the lower-frequency chrominance components of the composite video signal. The present invention provides an arrangement which meets these requirements in a form well suited for incorporation in mass-produced consumer television receivers.

SUMMARY OF THE INVENTION

Accordingly, it is a general object of the invention to provide a new and improved luminance-chrominance matrix amplifier for use in a color television receiver.

It is a more specific object of the invention to provide a luminance-chrominance matrix amplifier which may be economically incorporated in mass-produced consumer television receivers.

In accordance with the invention, a new and improved matrix amplifier stage is provided for a television receiver of the type having a cathode-ray tube image reproducer, and sources of luminance and chrominance signals, both derived from a received television transmission. The matrix amplifier stage comprises an amplifier device having input, output and common electrodes and means for supplying operating power to the amplifier device. A first voltage divider, having first and second end terminals and an adjustable tap, is provided, the first end terminal being coupled to the output electrode and the tap being direct-current coupled to the image reproducer. Means establish a predetermined voltage level at the output electrode corresponding to a reference beam-current condition in the image reproducer, and means are provided for applying to the second end terminal of the voltage divider a voltage substantially equal to the predetermined voltage level at the output electrode to permit the tap to be varied without varying the DC level applied to the image reproducer.

In further accord with the invention, a matrix amplifier stage is provided for combining a received luminance signal with a plurality of color-difference signals to form color control signals for a color image reproducer. The matrix amplifier stage comprises first and second amplifier devices each having input, output and common electrodes, and means are included for applying the luminance signal to the common electrodes and the color-difference signal to respective ones of the input electrodes. Means, including a frequency selective network comprising a common inductive element coupled to the base electrodes of the amplifier devices, are provided for establishing a predetermined frequency response characteristic in each of the amplifier devices.

It is a still more specific object of the invention to provide a luminance-chrominance matrix amplifier stage which incorporates provisions for independently adjusting the amplitude of the color-control drive signals applied to the receiver image reproducer without affecting the DC setup of the image reproducer.

It is another more specific object of the invention to provide a luminance-chrominance matrix amplifier which offers improved long term DC stability and improved frequency response.

BRIEF DESCRIPTION OF THE DRAWING

The features of the present invention which are believed to be novel are set forth with particularity in the appended claims. The invention, together with the further objects and advantages thereof, may best be understood by reference to the accompanying drawing, in which the single figure illustrates, partially in schematic form and partially in block form, a television receiver incorporating a luminance-chrominance matrix amplifier constructed in accordance with the invention.

DESCRIPTION OF THE PREFERRED EMBODIMENT

With the exception of certain detailed circuitry in its luminance-chrominance matrix amplifier stage, the illustrated receiver is essentially conventional in design and accordingly only a brief description of its structure and operation need be given here. A received signal is intercepted by an antenna 10 and coupled in a conventional manner to a tuner 11, which includes the usual radiofrequency amplifying and heterodyning stages for translating the signal to an intermediate frequency. After amplification by an intermediate-frequency amplifier 12, the signal is applied to a luminance and chrominance detector 13 wherein luminance and chrominance information in the form of a composite video-frequency signal is derived. The luminance component of this signal is amplified in a luminance amplifier 14 and applied to a luminance-chrominance matrix amplifier stage 15, wherein it is combined with red, green and blue color-difference signals independently derived by the receiver chrominance demodulator 16 to form suitable drive signals for the red, green and blue cathodes, 17, 18 and 19, respectively, of the receiver image reproducer 20. Matrix amplifier stage 15 will be described in detail later, and chrominance demodulator 16 is preferably identical to that described and claimed in the copending application of John L. Rennick, Ser. No. 629,764, filed Apr. 10, 1967, and assigned to the present assignee.

The output signal from intermediate-frequency amplifier 12 is also applied to a sound and sync detector 21, wherein a second composite video-frequency signal is derived which includes both sound and synchronizing components. The sound component is applied to sound circuits 22, wherein conventional sound demodulation and amplification circuitry develops an audio output signal suitable for driving a speaker 23. The synchronizing component, in the form of vertical and horizontal sync pulses, is separated from the composite signal by a sync clipper 24. A vertical deflection circuit 25 utilizes the separated vertical sync pulses to generate a synchronized vertical-rate sawtooth scanning signal in a vertical deflection winding 26. The horizontal sync pulses from sync clipper 24 are applied to horizontal deflection and high voltage circuits 27, which include conventional reaction-scanning-type circuitry for utilizing these pulses to generate a synchronized horizontal-rate sawtooth scanning current in a horizontal deflection winding 28, and high voltage DC accelerating potential for the ultor electrode of image reproducer 20.

The chrominance signal from luminance and chrominance detector 13, which includes color subcarrier and synchronizing burst components, is applied to a band-pass amplifying stage, chrominance channel 29, wherein it is amplified to a level sufficient for application to chrominance demodulator 16. The output from chrominance channel 29 is also applied to a subcarrier regeneration stage 30, wherein the synchronizing reference burst signal is separated from the composite chrominance signal and utilized to generate a continuous-wave demodulation signal required for synchronous demodulation in chrominance demodulator 16. Also, subcarrier regeneration stage 30 includes sensing circuitry for developing an automatic chrominance control (ACC) voltage, which is utilized to vary the gain of chrominance channel 29 inversely with variations in the received reference burst signal to compensate for amplitude variations in the received composite chrominance signal.

Referring now to the luminance-chrominance matrix amplifier 15, the amplified luminance signal from luminance amplifier 14 is applied directly to the base 31 of a NPN transistor 32, which serves as a low impedance constant-voltage luminance signal source for the emitters of the red, blue and green matrix amplifiers of stage 15, NPN transistors 33, 34 and 35, respectively. The collector 36 of transistor 32 is grounded and the luminance signal, at emitter 37, is coupled by way of a double-pole double-throw function switch 38 and respective ones of emitter resistors 39, 40 and 41 to the emitters 42, 43 and 44 of transistors 33, 34 and 35, respectively.

Concurrently with the application of the luminance signal to the three emitters, the R-Y, B-Y and G-Y color-difference signals from chrominance demodulator 16 are applied via individual voltage divider networks to the base electrodes 45, 46 and 47 of transistors 33, 34 and 35, respectively. The two signals matrix, and appear at the collector electrodes 48, 49 and 50 of the three transistors as R, B and G color control signals suitable for application to image reproducer 20.

For faithful color reproduction it is desirable that the image reproducer be direct-current coupled to the luminance and chrominance detectors, which necessitates that these detectors be direct-current coupled to the matrix amplifiers and that the matrix amplifiers be direct-current coupled to image reproducer 20. It is also desirable that means be provided for individually adjusting the drive to the three guns of the image reproducer to compensate for varying electron-gun efficiencies, and that this adjustment not interfere with the direct-current coupling of the color control signal. To these ends, and in accordance with one aspect of the invention, matrix amplifier transistors 33, 34 and 35 each include a novel output circuit for applying a portion of the amplified color control signals appearing on their collectors to the respective cathodes of the electron guns of image reproducer 20.

Furthermore, with present cathode-ray image reproducers it is desirable that the individual electron guns be operated at a relatively high cutoff potential to achieve the small spot size necessary for good detail in the reproduced image. In practice the screen grid potential applied to each gun is such that the guns operate with a grid-to-cathode cutoff characteristic of 150 v., which establishes the requirement that a positive potential of at least 150 v. appear on each cathode to completely cut off the picture tube. This assumes the control grids of the guns to be at ground potential, but in practice these grids are maintained at a positive potential of approximately 30 v. so that the matrix amplifier transistors need not be operated close to saturation to achieve full beam current. While this avoids possible nonlinear operation and mistracking of the transistors at high brightness levels, it does impose a requirement that 180 v. be applied to the cathodes for complete beam current cutoff. In the present embodiment the 30 v. potential is established by means of a two-element voltage divider comprising resistors 51 and 52 connected between B+ and ground, the juncture of these resistors being coupled by individual current limiting resistors 53, 54 and 55 to the individually bypassed control grids of the green, blue and red guns, respectively, of image reproducer 20.

To avoid the possibility of nonlinear operation of the matrix amplifier transistors and accompanying black compression in the reproduced image, the collectors of the transistors are operated from a supply voltage of approximately 250 v. This allows the 180 v. collector voltage required for cutoff of the picture tube to be achieved without the transistors themselves being completely cutoff. Variations in electron gun characteristics and matrix amplifier circuitry make it necessary to provide means for individually adjusting the cutoff of each gun to insure that the three guns will be cutoff concurrently, and in the present embodiment these means take the form of potentiometers 56, 57 and 58, which individually vary the screen grid voltages on the three guns. one end terminal of each potentiometer is connected to the 870 v. receiver boost supply through a common series voltage dropping resistor 59, and the other end terminal of each is connected to ground through a common voltage dropping resistor 60. The arms of the potentiometers are individually bypassed to ground at signal frequencies and connected directly to their respective screen grids. Through selection of resistance values, the range of adjustment is approximately from 550 to 700 v., corresponding to a range of cutoff voltages from 140 v. to 180 v.

Actual adjustment of cutoff is accomplished by actuating mode switch 38 to its setup position, which connects the emitters of transistors 33, 34 and 35 to ground through a common emitter impedance, resistor 61, and disables the vertical deflection stage for ease in comparing the relative brightness of the displays from the three electron guns. This causes a predetermined degree of conduction in the three transistors, and a predetermined positive potential to be developed on each of their collector electrodes. Potentiometers 56, 57 and 58 are now adjusted so that each gun is just extinguished, or cutoff, as determined by visual observation of its display on the receiver viewing screen. The cutoff characteristics having been thus adjusted to a common emitter reference voltage, mode switch 38 is returned to its normal position to apply luminance signal to the emitters, brightness being adjusted by varying the DC level of the luminance signal and contrast being varied by adjusting its amplitude.

In accordance with one aspect of the invention, each of the color amplifier transistors has associated with it a collector circuit which permits the portion of its output signal applied to image reproducer 20 to be varied without affecting setup. In the case of the red matrix amplifier, the collector 48 of transistor 33 receives operating power through a collector load resistor 62 and a series-connected peaking inductor 63. Inductor 63 is common to the other two amplifiers and serves to accentuate the response of all three matrix amplifiers to high frequency common-mode luminance information at 2.5 MHz. and above. A potentiometer 64 has one of its end terminals connected to collector 48 and its other end terminal connected to a unidirectional current source of predetermined potential, which comprises a four-element voltage divider consisting of resistors 65, 66 67 and 68 serially connected between B+ and ground. The arm of potentiometer 64 is connected to the red gun cathode of image reproducer 20 by a series current limiting resistor 69, which prevents damage to transistor 33 should a short develop in the image reproducer.

It will be recalled that during setup a predetermined potential was established on the collectors of the matrix amplifiers, and that the image reproducer cutoff was adjusted to correspond to this potential. In accordance with the invention, the potential applied by the voltage divider to potentiometer 64 is made, through selection of elements in the divider, to substantially equal this predetermined potential so that varying the position of the arm of the potentiometer will have only a negligible effect on the setup voltage applied to the red cathode. However, this does not prevent the potentiometer from functioning as a voltage divider relative to the red color-control drive signal to adjust the amplitude of that signal as applied to the red gun. A capacitor 70 is shunt-connected across potentiometer 64 to prevent unproportional attenuation of high frequency components relative to middle- and low-frequency components.

In accordance with another aspect of the invention, the four-element voltage divider is utilized to establish a degenerative feedback path for stabilizing the alternating current and direct current operation of transistor 33. Specifically, the juncture of resistors 66 and 67 in this divider is connected to base 45, applying to that electrode portions of the alternating and direct current components of the red color control signal appearing at collector 48. This adds substantially to the overall stability of the amplifier during both quiescent and active operational modes, since any change in voltage or signal amplitude at the output or collector electrode gives rise to a counteracting change at the control or base electrode of the transistor. In addition to the foregoing, the four-element divider network provides a convenient means for applying direct-current operating bias and R-Y color-difference signals from demodulator 16 to base 45. In the latter instance, the color-difference or R-Y signal is applied to the juncture of resistors 67 and 68, resistor 68 serving to terminate the demodulator output and resistor 67 serving to apply the color-difference signal to base 45.

The output circuits of the blue and green matrix amplifiers are structurally and functionally identical to the output circuit of the red matrix amplifier. In the case of the blue matrix amplifier, a resistor 71 serves as the collector load, a potentiometer 72 serves as the blue drive control, and a resistor 73 serves as the isolation resistor to the blue gun cathode. A capacitor 74 provides a high frequency shunt for potentiometer 72, and the four-element voltage divider serially comprises resistors 75, 76, 77 and 78. In the case of the green matrix amplifier, a resistor 79 serves as the collector load, a potentiometer 80 as the green drive control, and a resistor 81 as the isolation resistor. A capacitor 82 provides a high frequency shunt for the potentiometer, and the voltage divider serially comprises resistors 83, 84, 85 and 86.

In accordance with still another aspect of the invention, the base electrodes of matrix amplifier transistors 33, 34, and 35 are connected by capacitors 87, 88 and 89, respectively, to one terminal of an inductor 90, the other terminal of which is connected to ground. Inductor 90 forms a series resonant circuit in the 2 to 3 MHz. range with the three capacitors, thereby establishing a low-impedance path to ground in this frequency range between the bases and ground. Since the luminance signal is applied to the emitters of the matrix amplifiers, and to the bases via respective feedback paths including the previously described four-element voltage dividers, the resonant circuits to ground effectively serve as bypasses for the base electrodes, their net effect being to decrease degeneration and thereby "peak" or accentuate amplifier response within the resonant range. It is possible to use a single inductor for the three peaking circuits since these circuits affect only common-mode luminance information above 2 mHz, and not the color-difference information from demodulator 16, which is limited by band-pass circuitry in chrominance amplifier 29 to approximately 0.5 MHz. mHz. At much higher frequencies, in the order of 40 to 50 mHz, inductor 90 becomes in itself parallel resonant, thereby reducing bypass action by the capacitors to prevent amplification of spurious high frequency signals by the matrix amplifier transistors and subsequent radiation to other stages in the receiver.

A luminance-chrominance matrix amplifier stage has been described for combining luminance and color-difference signals to obtain suitable color-control drive signals for the cathodes of the three guns of a tricolor image reproducer. The stage includes provisions for setting-up the image reproducer and for varying the amplitude of the drive signals to accommodate varying electron gun efficiencies, and economical and effective feedback circuitry is provided for stabilizing output signal amplitude and direct-current operating levels. The fact that these functions are accomplished with a minimum of added circuit complexity, makes the stage especially well suited for economical construction in microelectronic form.

The following are a set of component values for the illustrated circuit which have been found to provide satisfactory operation in accordance with the invention. It will be appreciated that these values are given by way of example, and that other values may be substituted therefore without departing from the true principles of the present invention.

| | |
|---|---|
| TR 32 | Fairchild FT 3638 |
| TR 33, 34, 35 | Fairchild FT 123 |
| R 39, 40, 41 | 220 ohms ½ watt |
| R 51 | 220,000 ohms ½ watt |
| R 52 | 27,000 ohms ½ watt |
| R 53, 54, 55 | 100,000 ohms ½ watt |
| R 56, 57, 58 | 5,000,000 ohms |
| R 59 | 47,000 ohms ½ watt |
| R 60 | 82,000 ohms ½ watt |
| R 61 | 1,200 ohms ½ watt |
| R 62, 71, 79 | 18,000 ohms ½ watt |
| R 64, 72, 80 | 5,000 ohms ½ watt |
| R 65, 75, 83 | 27,000 ohms 1 watt |
| R 66, 76, 84 | 56,000 ohms 1 watt |
| R 67, 77, 85 | 1,000 ohms ½ watt |
| R 68, 78, 86 | 2,200 ohms ½ |
| R 69, 73, 81 | 2,200 ohms ½ watt |
| L 63 | 550 microhenries |
| L 90 | 10 microhenries |
| C 70, 74, 82 | 18 picofarads |
| C 87, 88, 89 | 100 picofarads |

While a particular embodiment of the invention has been shown and described, it will be obvious to those skilled in the art that changes and modifications may be made without departing from the invention in its broader aspects, and, therefore, the aim of the appended claims is to cover all such changes and modification.

We claim:

1. In a television receiver of the type having a cathode-ray tube image reproducer, a source of luminance signals, and a source of chrominance signals, both derived from a received television transmission, a matrix amplifier stage comprising:

an amplifier device having input, output and common electrodes;

means for supplying operating power to said amplifier device;

means for concurrently applying luminance and chrominance signals to respective input and common electrodes of said amplifier device;

a first voltage divider having first and second end terminals and an adjustable tap, said first end terminal being coupled to said output electrode, and said tap being direct-current coupled to said image reproducer;

means for establishing a predetermined voltage level at said output electrode corresponding to a reference beam-current condition in said image reproducer;

and means for applying to said second end terminal of said voltage divider a voltage substantially equal to said predetermined voltage level at said output electrode to permit said tap to be varied without varying the DC level applied to said image reproducer.

2. A matrix amplifier stage as described in claim 1, wherein said means for applying said voltage to said second end terminal of said voltage divider comprises a second voltage divider having a first end terminal for receiving unidirectional operating current, a second end terminal maintained at a reference potential, and a tap coupled to said second end terminal of said first voltage divider.

3. A matrix amplifier stage as described in claim 2, wherein said second voltage divider has a second tap located between said first tap and said second end terminal and coupled to the input electrode of said amplifier device, for simultaneously establishing a degenerative feedback path between said output and input electrodes of said device for stabilizing both the direct-current and alternating-current operation thereof and for providing operating bias to said input electrode.

4. A matrix amplifier stage as described in claim 3, wherein said second voltage divider has a third tap coupled to said chrominance signal source for applying said chrominance signal to said input electrode.

5. A matrix amplifier stage as described in claim 4, wherein said third tap is located between said second tap and said second end terminal.

6. A matrix amplifier stage as described in claim 3, wherein said stage comprises:

an additional amplifier device also having input, output and common electrodes;

means for supplying operating power to said additional amplifier device;

an additional voltage divider having first and second end terminals and an adjustable tap, its first end terminal being coupled to the output electrode of said additional amplifier device, and its tap being direct-current coupled to said image reproducer;

means for establishing a predetermined voltage level at the output electrode of said additional amplifier device corresponding to a reference beam-current condition in said image reproducer;

means comprising a further voltage divider having a first end terminal for receiving unidirectional operating current, a second end terminal maintained at a reverence potential, a first tap coupled to the second end terminal of said additional voltage divider, and a second tap located between such first tap and such second end terminal and coupled to the input electrode of said additional amplifier device, for applying to the remaining end terminal of said additional voltage divider a voltage substantially equal to said predetermined voltage level at the output electrode of said additional amplifier device, and for simultaneously establishing a degenerative feedback path between the output and input electrodes of said additional amplifier device for stabilizing both the direct-current and alternating-current operation thereof and for providing operating bias to the input electrode of said additional device; and means including a frequency selective network interposed between said base electrodes of said amplifier devices and said reference potential for establishing a predetermined frequency response characteristic for said degenerative feedback paths.

7. A matrix amplifier stage as described in claim 6 wherein said frequency selective network comprises an inductor having one end terminal maintained at a reference potential, and first and second capacitors coupled from the input electrodes of respective ones of said amplifier devices to the remaining end terminal of said inductor.

8. A matrix amplifier stage as described in claim 7, wherein said inductor and said capacitors are series resonant in the range of 2 to 3 mHz. to accentuate high frequency luminance signal information, and said inductor is self-resonant at frequencies between 40 and 50 MHz. to reduce undesired radiation.

9. A matrix amplifier as described in claim 1, wherein said predetermined voltage level corresponds to the cutoff point of the electron beam in said image reproducer.

10. A matrix amplifier as described in claim 1, wherein said amplifier device is a transistor having input-base, output-collector and common emitter electrodes and wherein said means for establishing said predetermined voltage level comprises means for establishing a predetermined emitter-base bias on said amplifier device.

11. In a matrix amplifier stage for combining a received luminance signal with a plurality of color-difference signals to form color control signals for a color image reproducer:

first and second amplifier devices each having input, output and common electrodes;

means for applying said luminance signal to said common electrodes and said color-difference signals to respective ones of said input electrodes;

means for applying negative feedback from the output electrodes of the first and second amplifiers to the input electrodes of the first and second amplifiers;

and means including a frequency selective network comprising a common inductive element coupled between the input electrodes of said amplifier devices and a reference potential for establishing a predetermined frequency response characteristic in each of said amplifier devices.

12. A matrix amplifier as described in claim 11, wherein said frequency selective network comprises an inductor having one end terminal maintained at a reference potential and one end terminal coupled by first and second capacitors to the input electrodes of respective ones of said amplifier devices.

13. A matrix amplifier as described in claim 12, wherein said inductor and said capacitors are series resonant in the range of 2 to 3 MHz. to accentuate high frequency luminance signal information, and said inductor is self-resonant at frequencies between 40 and 50 MHz. to reduce undesired radiation.